United States Patent
Markus et al.

(10) Patent No.: US 11,543,685 B2
(45) Date of Patent: Jan. 3, 2023

(54) METHOD AND APPARATUS FOR IMAGE SPACING

(71) Applicants: David T. Markus, Irvine, CA (US); Michael C. Hayes, Irvine, CA (US)

(72) Inventors: David T. Markus, Irvine, CA (US); Michael C. Hayes, Irvine, CA (US)

(*) Notice: Subject to any disclaimer, the term of this patent is extended or adjusted under 35 U.S.C. 154(b) by 273 days.

(21) Appl. No.: 15/915,057

(22) Filed: Mar. 7, 2018

(65) Prior Publication Data
US 2018/0259795 A1 Sep. 13, 2018

Related U.S. Application Data

(60) Provisional application No. 62/468,284, filed on Mar. 7, 2017.

(51) Int. Cl.
*G02C 11/00* (2006.01)
*G02C 7/04* (2006.01)

(52) U.S. Cl.
CPC ............ *G02C 11/10* (2013.01); *G02C 7/04* (2013.01)

(58) Field of Classification Search
None
See application file for complete search history.

(56) References Cited

U.S. PATENT DOCUMENTS

| | | | | |
|---|---|---|---|---|
| 10,317,705 B2* | 6/2019 | Pugh | ............... | G02B 27/0172 |
| 2007/0165991 A1* | 7/2007 | Huber | ............... | G02B 6/032 |
| | | | | 385/125 |
| 2007/0280304 A1* | 12/2007 | Deile | ............... | G02B 6/02328 |
| | | | | 372/6 |
| 2008/0137091 A1* | 6/2008 | Sanders | ............... | G01C 19/727 |
| | | | | 356/461 |
| 2009/0189830 A1* | 7/2009 | Deering | ............... | G09G 3/02 |
| | | | | 345/1.3 |
| 2009/0207379 A1* | 8/2009 | Oakley | ............... | G02B 27/283 |
| | | | | 353/20 |
| 2009/0238215 A1* | 9/2009 | Varming | ............... | G02B 6/02361 |
| | | | | 372/6 |
| 2016/0320010 A1* | 11/2016 | Weiss | ............... | F21S 41/19 |

FOREIGN PATENT DOCUMENTS

WO WO-2016161463 A1 * 10/2016 ............... G02C 7/04

* cited by examiner

*Primary Examiner* — Christopher Stanford
*Assistant Examiner* — Journey F Sumlar
(74) *Attorney, Agent, or Firm* — Kafantaris Law Offices; Theo Kafantaris

(57) ABSTRACT

A method and apparatus is disclosed for artificially creating space within a lens such that, when an image is projected from the lens onto the retina of the user, the image appears to be positioned further away than it actually is. This is accomplished by embedding a series of projection tubes on the perimeter of a lens adapted to project an image inward toward the retina of the user. The projection tubes will provide artificial spacing and cause the projected image to seem distant or otherwise positioned further away, creating a more realistic viewpoint for the user.

16 Claims, 4 Drawing Sheets

METHOD AND APPARATUS FOR IMAGE SPACING

CROSS-REFERENCE TO RELATED APPLICATIONS

This application claims the benefit of U.S. Provisional Patent Application No. 62/468,284, filed on Mar. 7, 2017, both of which are incorporated herein by reference.

STATEMENT REGARDING FEDERALLY SPONSORED RESEARCH AND DEVELOPMENT

Not Applicable.

FIELD OF THE INVENTION

This invention relates generally to imaging spacing, and more particularly, to a method and apparatus for creating artificial spacing in a lens for image projection.

DISCUSSION OF RELATED ART

A lens can generally be described as a device made from glass or other transparent material adapted to refract light. Generally, lenses have fixed focal properties and are manufactured for specific purposes. For example, eyeglasses and contact lenses are examples of lenses adapted to provide vision correction by converging the light onto the eyes. A magnifying glass is an example of a lens adapted to enlarge a target area visually by converging the light passing through the area into a beam. Telescopes, cameras, microscopes, and projectors all utilize lenses to provide their utility.

Contact lenses are generally thin and light devices adapted to temporarily attach to the eyes for providing refractive error correction. There are two common types of contact lenses, hard lenses and soft lenses. Soft lenses are typically made from hydrogel or silicone hydrogel, which allow them to expand and contract, making them more comfortable for daily use. Benefits to lens wearers associated with silicone hydrogel contact lenses can be attributed, at least in part, to the combination of hydrophilic components and the hydrophobic properties of silicon-containing polymeric materials of the contact lenses.

Image projection can generally be described as optically projecting an image from one location to another. One primary example of image projection is a video or movie projector, where light is passed through a moving reel of image negatives, through a lens, and onto a flat surface, where the projected images are enlarged and displayed. Generally, image projection utilizes a lens, although images may be directly projected onto a surface using lasers. Furthermore, while image projection traditionally utilizes a projection surface, retinal projectors are adapted to project an image directly onto the retina of the eye.

While current lenses are adapted to provide vision correction or otherwise adjusting focal properties, there is currently no method or device for artificially creating space within a lens. Furthermore, with the current evolution of electronic lenses where the lens becomes the vessel for all electronics and functional components, the size of the vessel is a limiting factor in all design choices. Therefore, there is a continued need for a device adapted to artificially create space within a lens such that, when an image is projected from the lens onto the retina of the user, the image appears to be positioned further away than it actually is. The present invention satisfies this need.

SUMMARY OF THE INVENTION

The present invention is a method and apparatus artificially creating space within a lens such that, when an image is projected from the lens onto the retina of the user, the image appears to be positioned further away than it actually is. Furthermore, the present invention is neither cumbersome nor obstructive to the user. This is accomplished by embedding a series of projection tubes on the perimeter of a lens adapted to project an image inward toward the retina of the user. The projection tubes will provide artificial spacing and cause the projected image to seem distant or otherwise positioned further away, creating a more realistic viewpoint for the user.

Specifically, the present invention discloses a method and apparatus for projecting an image onto the retina through a series of patterned projection tubes positioned on the perimeter of the lens to alleviate some of the size limitations in modern electronic lenses. For example, the existing average contact lens has a thickness range of about 150 um and will not fit a projector lens system with a thickness of 50 mm. The present invention will allow a projector lens system with a functionally equivalent thickness of 50 mm to fit inside a contact lens with a space thickness of 150 um. Furthermore, the present invention is unpowered, durable, and may be incorporated into the elastic material of a contact lens, intraocular lens, or any other lens with a thickness constraint such as a pair of glasses. This is accomplished by utilizing one or a plurality of projection tubes and prisms to project the image or series of images inward toward the retina of the user. The projection tubes and prisms may be positioned in a plurality of patterns suitable for the lens environment and amount of desired artificial spacing.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Figure 1:
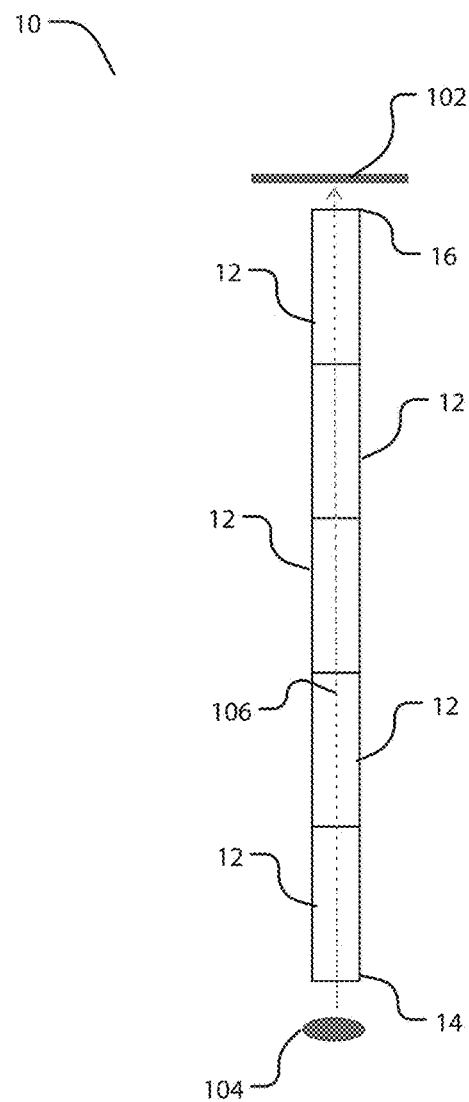
FIG. 1 is a diagram illustrating a top view of a plurality of projection tubes, wherein an image is projected through the tubes.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The present invention 10 provides a method and apparatus for artificially creating space within a lens 52 such that a projected image 102 appears to be positioned further away than it actually is. This is accomplished by embedding a plurality of projection tubes 12 on the perimeter of a lens 52, wherein the plurality of projection tubes 12 are adapted to receive a source image 104 as input and adapted to output a projected image 102 toward the retina of the user. The projection tubes 12 will provide artificial spacing and cause the projected image 102 to seem distant or otherwise positioned further away, creating a more realistic viewpoint for the user.

The projection tubes 12 are adapted to carry light 106 from a proximal end 14 to a distal end 16 without changing any focal properties. The projection tubes 12 are straight, elongated tubes with open proximal 14 and distal ends 16. In the preferred embodiment, the projection tubes 12 are cylindrical, although any shape may be used to suit the specific needs and parameters of the lens 52. The sidewalls 32 of the projection tubes 12 are opaque while the inner portion 34 is transparent and can be filled with air, fluid, or a transparent solid material such as glass. The projection tubes 12 can range from 75%-100% opaqueness, and can range from 50%-100% transparency. The diameter of each projection tube 12 can vary depending on the size or resolution of the source image 104 to be projected, but all sizes are adapted to fit into size-constrained environments such as a contact lens environment. In the preferred embodiment, no focal lens 36 is used on any projection tubes 12. In an alternative embodiment, a focal lens 38 is positioned at the proximal 14 and/or distal 16 ends of each projection tube 12 to alter focal properties. Examples of focal properties include magnifying and focusing the source image 104 by modifying the refractive power and focal length of the light 106 passing through the projection tubes 12.

The projection tubes 12 are positioned in a pattern around the perimeter of a lens 52 and adapted to transmit light 106 from a proximal end 14 to a distal end 16. A prism 42 is positioned between each projection tube 12 such that the transmitted light 106 will enter the proximal end 14 of a first projection tube 12 and exit through the distal end 16, change direction within the prism 42 towards a second projection tube 12, and enter the proximal end 14 of the adjacent second projection tube 12. Each prism 42 will have specific prism angles which vary depending on the pattern 22 used, but ultimately, are adapted to transmit all light 106 between adjacent, connected projection tubes 12 such that all light 106 entering the proximal end 14 of a first projection tube 12 will be emitted from the distal end 16 of a last projection tube 12. A plurality of patterns 22 may be used, such as any digital wave pattern, so long as it effectively lengthens the distance that the light 106 travels before reaching the eye of the user. In the preferred embodiment, the pattern 22 is a serpentine or square wave pattern, as shown in FIGS. 2, 4, 5a, 5b, and 5c, where the prism 42 angle is 90 degrees. In an alternative embodiment, the pattern 22 is a triangular wave pattern. In a further alternative embodiment, the pattern 22 is a sawtooth pattern.

The preferred embodiment further comprises an image generator chip 54, a linear image output port 56, and a display projector 58 positioned at the proximal end 14 of a first projection tube 12. The display projector 58 can be any projector chip such as an LCD, LED, OLED, holographic, or laser light display optically connected to the proximal end 14 of a first projection tube 12. The present invention 10 is unpowered, durable, and may be incorporated into the elastic material of a contact lens, into an intraocular lens, or used in front of the face such as in a helmet, head mounted display, pair of glasses, or other forms of optical systems that require artificial distance creation. Furthermore, environmental constraints within contact and intraocular lenses, such as extreme size limitations, hydration, and biocompatibility factor into the present invention 10. For example, contact lenses have an average thickness of 150 micrometers. This distance can be artificially extended by 40 millimeters, for example, by providing ten projection tubes 12 having a length of four millimeters each, or twenty projection tubes 12 having a length of two millimeters each. As such, the projection tubes 12 may utilize lengths and patterns 22 suitable for the lens 52 environment and amount of desired artificial spacing.

Figure 2:
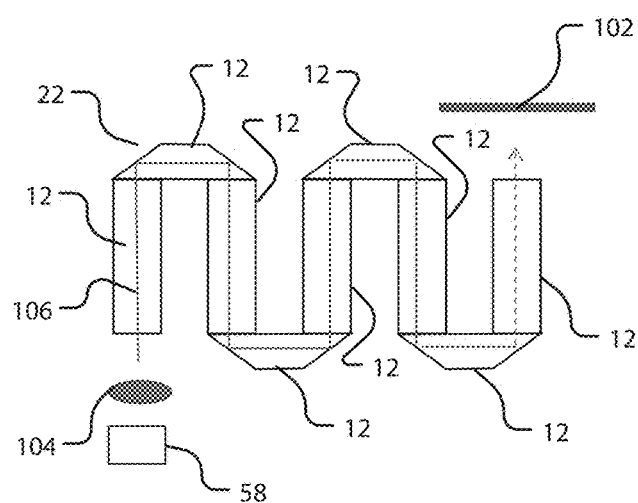
FIG. 2 is a diagram illustrating a top view of a plurality of projection tubes in a serpentine, square wave pattern, wherein an image is projected through the tubes.
Figure 3:
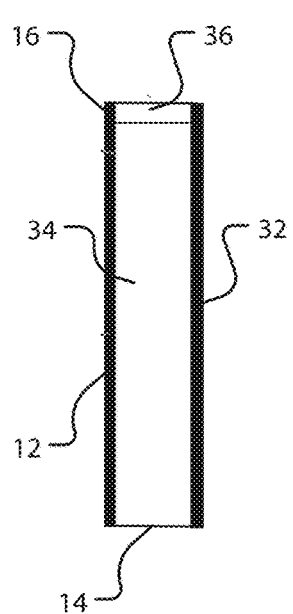
FIG. 3 is a diagram illustrating a single projection tube.
Figure 4:
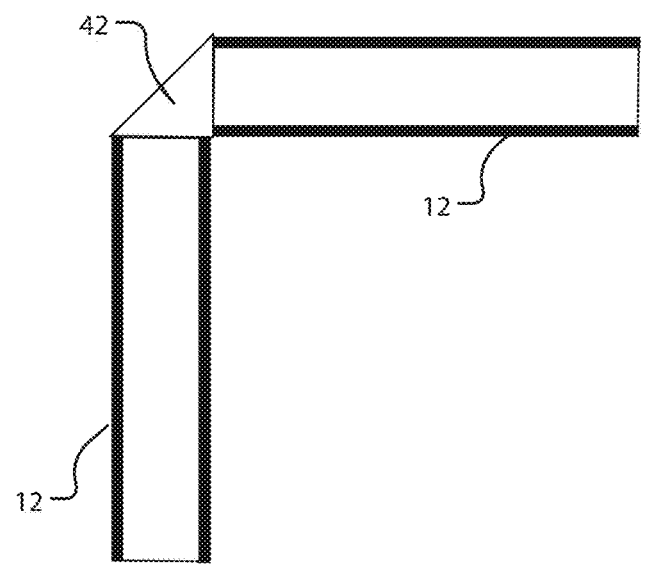
FIG. 4 is a diagram illustrating a prism connecting two projection tubes at an angle, wherein the prism redirects an image from a first projection tube to a second projection tube.
Figure 5A:
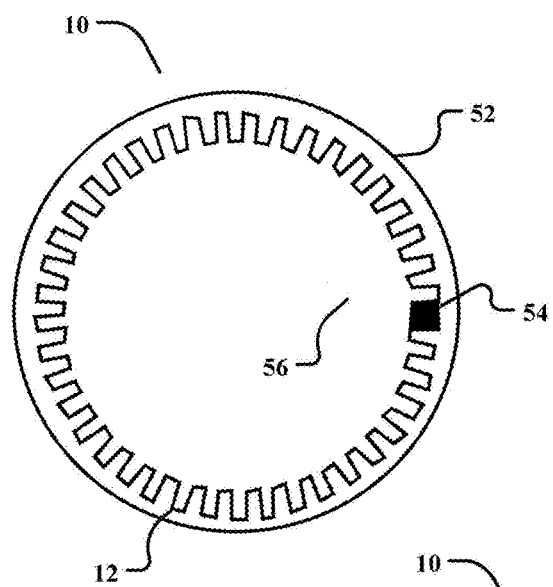
FIG. 5a is a diagram illustrating a top view of the present invention implemented within in a contact lens.
Figure 5B:
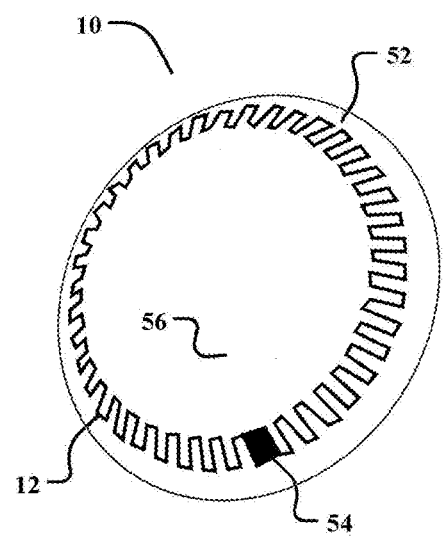
FIG. 5b is a diagram illustrating an isometric view of the present invention implemented within in a contact lens.
Figure 5C:
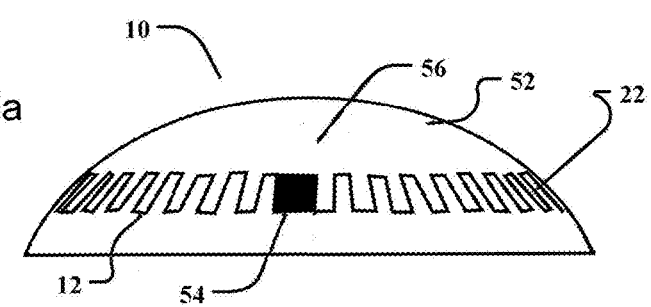
FIG. 5c is a diagram illustrating a side view of the present invention implemented within in a contact lens.
Figure 6:
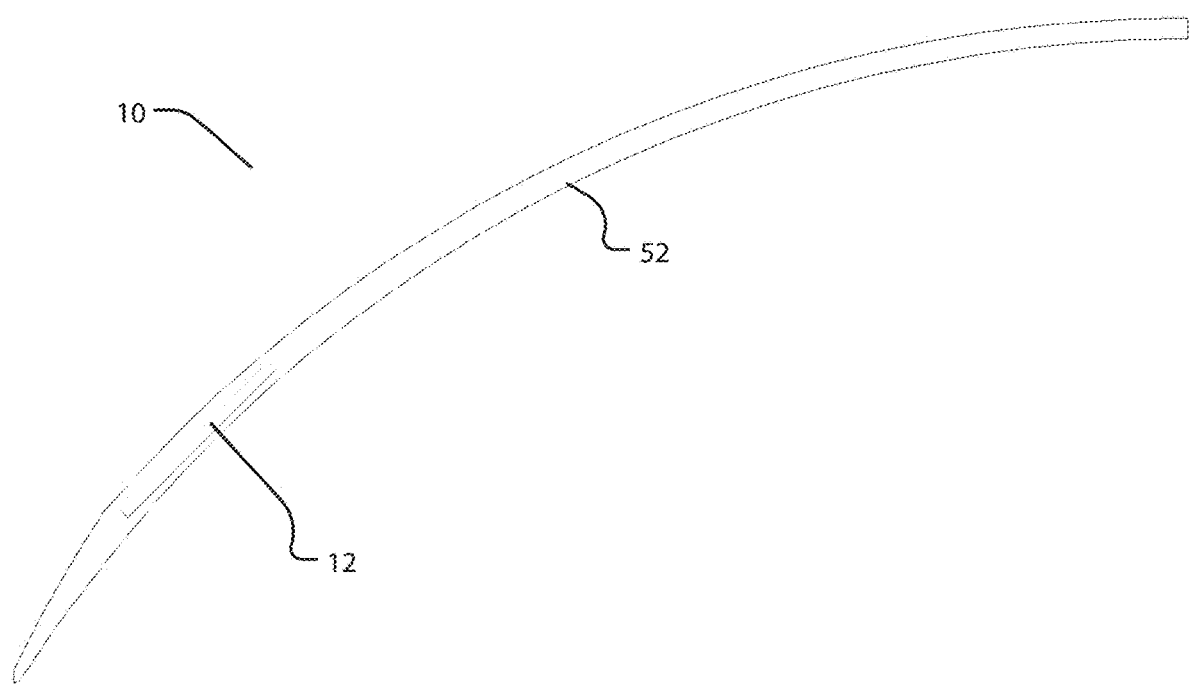
FIG. 6 is a diagram illustrating a cross-sectional view of the present invention implemented within a contact lens.

FIG. 1 illustrates a plurality of projection tubes 12 positioned adjacent to one another with no prisms 42. FIG. 2 figuratively illustrates how the projection tubes 12 from FIG. 1 are repositioned in a serpentine, square wave pattern 22, and how the light 106 passes from one end to another. As can be seen, the size and space limitations of FIGS. 1 and 2 are very different, illustrating the benefits of the present invention. FIG. 3 illustrates a single projection tube 12 while FIG. 4 illustrates how a prism 42 will redirect the light 106 from a distal end 16 of a first projection tube 12 to a proximal end 14 of an adjacent, second projection tube 12. FIG. 5 illustrates the present invention 10 positioned on the outer perimeter of a contact lens 52, outside of the field of view of the contact lens 52. FIG. 6 illustrates a cross-sectional view of a contact lens 52 showing the position of the present invention 10 on the perimeter of the lens 52.

The first step during manufacturing the present invention 10 within a contact lens comprises creating the lens spacing apparatus. First, the desired artificial spacing distance must be established. From this, the pattern 22, width, and length of the projection tubes 12 will be established. A circuit will then be created with an image generator chip 54, a linear image output port 56, and a display projector 58 optically connected to the projection tube 12 apparatus. In the preferred embodiment, the image generator chip 54, linear image output port 56, display projector 58, projection tubes 12, and prisms 42 are adapted to withstand high temperatures commensurate with the lens spacing apparatus material curing process below.

Once the lens spacing apparatus is created, it can be integrated into the contact lens 52 material. Specifically, it is placed directly into a contact lens mold member, preferably the female mold member, or first (anterior) contact lens mold member. The placement would occur preferably robotically and be coupled with a means of centering the assembly and a means of controlling the depth of the assembly during the filling of the mold with a lens precursor material, which can be understood to be a polymerizable silicone hydrogel lens precursor composition. The polymerizable silicone hydrogel lens precursor composition may be understood to be a pre-polymerized or pre-cured composition suitable for polymerization. In alternative embodiments, the lens precursor material may be comprised of silicone, hydrogel, polyimide, kapton, parylene, or SU-8. Non-stretchable lens precursor materials comprise metals, ceramics, and crystals.

The first contact lens mold member is placed in contact with a second contact lens mold member to form a contact lens mold having a contact lens-shaped cavity. Next, the two contact lens mold members are placed in contact with one another to form a contact lens shaped cavity, with the polymerizable silicone hydrogel lens precursor composition and lens spacing apparatus positioned within the contact lens shaped cavity. The polymerizable silicone hydrogel lens precursor composition is then cured to form a pre-extracted polymerized silicone hydrogel contact lens product. The contact lens mold is then demolded, where the two mold members are separated. The pre-extracted polymerized silicone hydrogel contact lens product is then separated from the contact lens mold members, or delensed. After delensing, the pre-extracted silicone hydrogel contact lens product is extracted. After extraction, the extracted polymerized silicone hydrogel contact lens product is hydrated with water or an aqueous solution to form a hydrated silicone hydrogel contact lens.

In view of the above, it can be understood that the pre-extracted polymerized silicone hydrogel contact lens products and the extracted polymerized silicone hydrogel contact lens products are water swellable products or elements, and that the hydrated silicone hydrogel contact lens is a product or element swollen with water. As used herein, a silicone hydrogel contact lens refers to a silicone hydrogel element that has undergone a hydration step. Thus, a silicone hydrogel contact lens can be understood to be a fully hydrated silicone hydrogel contact lens, a partially hydrated silicone hydro gel contact lens, or a dehydrated silicone hydrogel contact lens. A dehydrated silicone hydrogel contact lens refers to a contact lens that has undergone a hydration procedure and has subsequently been dehydrated to remove water from the lens.

After hydrating the extracted silicone hydrogel contact lens product to produce a silicone hydrogel contact lens, the lens spacing apparatus will be embedded within and ready for use. The lens spacing apparatus may be used by activating the display projector 58 within the contact lens 52. The next step comprises packaging the silicone hydrogel contact lens. For example, the silicone hydrogel contact lens can be placed in a blister pack or other suitable container that includes a volume of a liquid, such as a saline solution, including buffered saline solutions. The stretchable polymer will generally have a curved or hemispherical shape.

While the above description contains specific details regarding certain elements, sizes, and other teachings, it is understood that embodiments of the invention or any combination of them may be practiced without these specific details. Specifically, although certain shapes and patterns are designated in the above embodiments, any suitable shape or pattern may be used. These details should not be construed as limitations on the scope of any embodiment, but merely as exemplifications of the presently preferred embodiments. In other instances, well known structures, elements, and techniques have not been shown to clearly explain the details of the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An image spacing apparatus, comprising:
   a plurality of projection tubes configured to transmit light from a proximal end to a distal end, wherein said plurality of projection tubes comprise hollow, elongated tubes filled with air, wherein said air is a medium for said light to pass through, wherein said projection tubes are opaque;
   a plurality of prisms optically connected between adjacent projection tubes and configured to redirect light between said adjacent projection tubes, wherein each of said plurality of prisms is positioned between each said plurality of projection tubes; and
   a display projector optically connected to the proximal end of said plurality of projection tubes;
   wherein said plurality of projection tubes and plurality of prisms are positioned on the perimeter of a contact lens environment and adapted to transmit light from said display projector to the distal end of said plurality of projection tubes and onto the retina of the user, wherein the image appears to be positioned further away than it actually is due to the artificial spacing within the plurality of projection tubes.

2. The image spacing apparatus of claim 1, wherein an image generator chip, a linear output port, and said display projector comprise a circuit, and wherein said display projector is optically connected to the proximal end of said plurality of projection tubes.

3. The image spacing apparatus of claim 1, wherein said plurality of projection tubes further comprise a pattern.

4. The image spacing apparatus of claim 3, wherein said pattern is a square wave pattern.

5. The image spacing apparatus of claim 3, wherein said pattern is a sine wave pattern.

6. The image spacing apparatus of claim 1, wherein said projection tubes are transparent.

7. The image spacing apparatus of claim 1, wherein said projection tubes further comprise a focal lens at their proximal end, their distal end, or both, and wherein said focal lens is adapted to magnify or reduce a projected image.

8. The image spacing apparatus of claim 1, wherein said display projector is an LCD, LED, OLED, holographic, or laser light display projector.

9. A method of manufacturing a contact lens with an image spacing apparatus, the method comprising:
    transmitting light from a proximal end to a distal end of a plurality of projection tubes, wherein said plurality of projection tubes comprise hollow, elongated tubes filled with air, wherein said air is a medium for said light to pass through, wherein said projection tubes are opaque and positioned on the perimeter of said contact lens;
    redirecting light between adjacent projection tubes through a plurality of prisms optically connected between adjacent projection tubes, wherein each of said plurality of prisms is positioned between each said plurality of projection tubes; and
    displaying an image onto a first projection tube with a display projector optically connected to said first projection tube;
    wherein said plurality of projection tubes and plurality of prisms transmit light from a display projector to the distal end of said plurality of projection tubes and onto the retina of the user.

10. The method of claim 9, wherein said plurality of projection tubes further comprise optical fiber.

11. The method of claim 10, wherein said optical fiber further comprises an optical core and transparent cladding surrounding, said transparent cladding further comprising a lower index of refraction than that of the core, wherein said transparent cladding is configured to reflect said light within the core by total internal reflection, where the angles of reflection are never great enough to cause the light to exit said core.

12. The method of claim 9, wherein an image generator chip, a linear output port, and said display projector comprise a circuit, and wherein said display projector is optically connected to the proximal end of said plurality of projection tubes.

13. The method of claim 9, wherein said plurality of projection tubes further comprise a pattern, and wherein said pattern is a square wave pattern.

14. The method of claim 9, wherein said projection tubes are transparent.

15. The method of claim 9, wherein said projection tubes further comprise a focal lens at their proximal end, their distal end, or both, and wherein said focal lens is adapted to magnify or reduce a projected image.

16. A method of manufacturing contact lens with an image spacing apparatus, the method comprising:
    forming an image spacing contact lens assembly, said image spacing contact lens assembly comprising a plurality of projection tubes configured to transmit light from a proximal end to a distal end and a plurality of prisms optically connected between adjacent projection tubes and configured to redirect light between said adjacent projection tubes, wherein said plurality of projection tubes comprise hollow, elongated tubes filled with air, wherein said air is a medium for said light to pass through, wherein said projection tubes are opaque and positioned on the perimeter of said contact lens, and wherein each of said plurality of prisms is positioned between each said plurality of projection tubes;
    placing said image spacing contact lens assembly within a first contact lens mod member;
    filling said first contact lens mold with a lens precursor material;
    enclosing said image spacing contact lens assembly and lens precursor material with a second contact lens mold member, forming a contact lens-shaped cavity;
    curing said image spacing contact lens assembly and lens precursor material to create a contact lens with an image spacing apparatus;
    demolding said contact lens with image spacing apparatus;
    delensing said contact lens with image spacing apparatus;
    extracting said contact lens with image spacing apparatus;
    hydrating said contact lens with image spacing apparatus in an aqueous solution; and
    packaging said contact lens with image spacing apparatus;
    wherein said hydration of said contact lens with image spacing apparatus will cause the lens precursor material and imaging contact lens assembly to expand in size.

* * * * *